US011079818B2

United States Patent
Lu

(10) Patent No.: US 11,079,818 B2
(45) Date of Patent: Aug. 3, 2021

(54) FAN CONTROL

(71) Applicant: HEWLETT PACKARD ENTERPRISE DEVELOPMENT LP, Houston, TX (US)

(72) Inventor: Hsin Chang Lu, Taipei (CN)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 16/097,548

(22) PCT Filed: Apr. 29, 2016

(86) PCT No.: PCT/US2016/030027
§ 371 (c)(1),
(2) Date: Oct. 29, 2018

(87) PCT Pub. No.: WO2017/188975
PCT Pub. Date: Nov. 2, 2017

(65) Prior Publication Data
US 2019/0155348 A1    May 23, 2019

(51) Int. Cl.
*G06F 1/20* (2006.01)
*G05B 15/02* (2006.01)

(52) U.S. Cl.
CPC .............. *G06F 1/206* (2013.01); *G05B 15/02* (2013.01)

(58) Field of Classification Search
CPC ................................ G05B 15/02; G06F 1/206
See application file for complete search history.

(56) References Cited

U.S. PATENT DOCUMENTS

| | | | | |
|---|---|---|---|---|
| 6,318,965 | B1* | 11/2001 | Nair | F04D 27/004 417/17 |
| 6,865,506 | B1* | 3/2005 | Escobar | G11B 33/144 702/127 |
| 9,506,821 | B1* | 11/2016 | Robillard | G01K 11/00 |
| 2005/0024828 | A1* | 2/2005 | Espinoza-Ibarra | H05K 7/207 361/695 |
| 2005/0071117 | A1 | 3/2005 | Escobar et al. | |
| 2008/0148303 | A1* | 6/2008 | Okamoto | G11B 33/126 720/652 |
| 2010/0217543 | A1 | 8/2010 | Bougaev et al. | |
| 2011/0029151 | A1* | 2/2011 | Tang | G05D 23/1917 700/300 |

(Continued)

FOREIGN PATENT DOCUMENTS

WO    WO-0225870 A1    3/2002

OTHER PUBLICATIONS

Kim et al., Understanding the Performance-Temperature Interactions in Disk I/O of Server Workloads, Nov. 2005, Department of Computer Science University of Virginia, Charlottesville, VA 22904, p. 1-21.*

(Continued)

*Primary Examiner* — Kidest Bahta
(74) *Attorney, Agent, or Firm* — International IP Law Group, PLLC

(57) ABSTRACT

Examples described herein relate to fan control. For example, operating a computing device includes storing data on a data storage device of the computing device and controlling a fan of the computing device based on throughput of the data storage device.

13 Claims, 4 Drawing Sheets

(56) References Cited

U.S. PATENT DOCUMENTS

| | | | | |
|---|---|---|---|---|
| 2011/0228471 A1* | 9/2011 | Humphrey | ............ | F04D 27/004 |
| | | | | 361/679.48 |
| 2011/0320062 A1* | 12/2011 | Tan | .................... | G05D 23/1919 |
| | | | | 700/300 |
| 2012/0143389 A1* | 6/2012 | Wang | ................. | G05D 23/1934 |
| | | | | 700/300 |
| 2012/0224322 A1* | 9/2012 | Artman | .............. | H05K 7/20209 |
| | | | | 361/679.48 |
| 2014/0052311 A1* | 2/2014 | Geissler | ................. | G05D 23/19 |
| | | | | 700/300 |
| 2014/0195066 A1* | 7/2014 | Nanda | .................... | G06F 1/206 |
| | | | | 700/300 |
| 2014/0340787 A1 | 11/2014 | Kwon | | |

OTHER PUBLICATIONS

Chan et al., Correcting vibration-induced performance degradation in enterprise servers, 2013, §Oracle Physical Sciences Research Center, San Diego, CA, ‡Dept. of Computer Science and Engineering University of California, San Diego, CA, p. 1-6. (Year: 2013).*
International Search Report and Written Opinion, International Application No. PCT/US2016/030027, dated Jan. 25, 2017, pp. 1-13, KIPO.

* cited by examiner

FAN CONTROL

BACKGROUND

One or more rotating fans may be employed in a computing device to dissipate or remove heat and cool operating components in the computing device. As computing devices (including servers and storage systems) grow more powerful so do their heat generation. The processors, graphics cards, memory including random access memory (RAM), hard disk drives (HDD), etc., and other components in computers have generally increased in speed and power consumption. Thus, the amount of heat produced by these components as a side-effect of normal operation has generally increased. These components should typically be kept within a specified temperature range to avoid overheating, instability, malfunction, and damage that would lead to a shortened component lifespan.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

Figure 1:
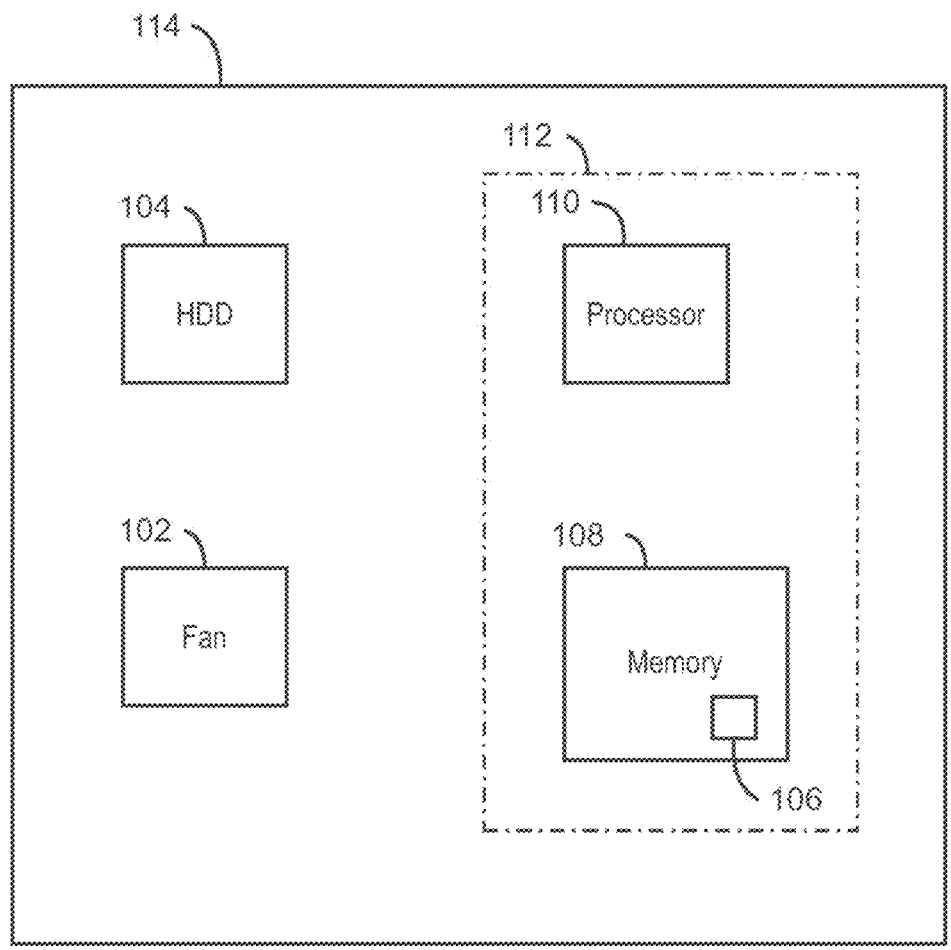
FIG. 1 is a block diagram of a computing device having a fan and a data storage device (e.g., hard disk drive or HDD) in accordance with examples.

Examples of the present techniques related generally to control of one or more fans in a computing device, and to reducing or avoiding throughput degradation of a hard disk drive (HDD) of the computing device caused by vibration of the fan. Indeed, some embodiments are generally directed to self-tuned or smart thermal fan-speed control for reduction or prevention of degradation of throughput of one or more HDDs of a computing device. Examples give a system and method of controlling a fan in a computing device, including determining data-rate throughput of a hard drive in the computing device, and reducing a rotational speed of the fan in the computing device in response to a reduction in the data-rate throughput of the hard drive.

Fan vibration which may be correlative with fan speed may degrade (reduce) HDD throughput. In response, the present technique reduces fan speed in response to a reduction of data-rate throughput of a HDD. To avoid or reduce degradation of HDD throughput caused by fan vibration, some conservative approaches may cap fan speed proactively even though HDD throughput is not degrading. However, the present technique may reduce fan speed dynamically based on level of HDD throughput degradation. A level of HDD throughput degradation can be determined by calculating current HDD throughput read by a RAID controller, for instance. As for a particular example of fan control, fan speed may be overridden and reduced when level of HDD throughput degraded more than 25% for instance.

The technology may involve instructions overriding current system fan speed, with the overriding instructions based on level of HDD throughput degradation. Fan speed control instructions may work generally based on temperature margin of each component in the computing device. However, in accordance with the present techniques, the instructions (code, logic) may override the control based on temperature margin such that the control is also based on level of HDD throughput degradation (e.g., including when a system fan is at high speed).

In view of dense growth on a server, the speed of server system fan may be increased to increase thermal capacity but such increase in speed may induce fan vibration deprecating HDD throughput. Embodiments create instructions (function, procedure, code, logic, etc.) that override typical system fan speed controlled by temperature, with the overriding instructions based on level of HDD throughput degradation dynamically.

Moreover, while the discussion herein may generally focused on fans (in computers), the techniques may also apply to air mover devices other than fans in the computing device, and to pumps that circulate liquid for liquid cooling of the computing device. Indeed, the present techniques may apply to cooling system devices generally in the computing system in which cooling system device vibration (or other adverse impact) may result in degradation or reduction of HDD throughput. The techniques may adjust (based on HDD throughput) the speed or operation of air movers in the computing device other than fans, the speed or operation of a liquid cooling circulating pump, and/or the operation of cooling system devices generally.

In examples, maximum fan speed is not capped for all circumstances to avoid HDD throughout degradation caused by fan vibration. Indeed, a conservative technique of capping maximum fan speed in all circumstances (including when the HDD throughput is not degraded) may unnecessarily limit thermal capacity. For HDD throughput degraded prevention or reduction, capping the maximum fan speed (e.g., at 80%) across the board may needlessly limit thermal capability. The level of capping maximum fan speed may be determined by corner case which means particular drive at particular HDD bay and such capping is not needed for most actual cases. Embodiments can resume thermal capacity in actual cases.

In sum, fan speed control may work based on temperature margin of each component. Examples of the present techniques add executable code for the fan control scheme that override such control, with the additional control based on level of HDD throughput degradation (including when the system fan is at high speed, for instance). Level of HDD throughput degradation can be determined dynamically by calculating current HDD throughput read, for example, by a RAID controller referring to throughput when qualifying this HDD. System fan speed may be overridden and reduced when level of HDD throughput degraded more than 25% in some examples.

The data-rate transfer speed or throughput of a data storage device (e.g., HDD) may be the capability (e.g., in megabyte per second or MB/s) of the data transfer of the HDD. The above-discussed control system overrides fan speed to reduce the fan speed if the HDD throughput degrades or reduces by a threshold amount. If that threshold amount is say 25% in an arbitrary example, and if the capability or maximum (or standard) throughput of the HDD is say 200 MB/s in then arbitrary example, then the fan speed will be reduced (say to 80% of maximum fan speed) when the throughput of the HDD drops to below 150 MB/s.

FIG. 1 is a computing device 100 having a fan 102 and a data storage device 104 such as a hard disk drive (HDD), solid state drive (SSD), and/or other type of storage device. The computing device 100 may include more than one fan 102 and more than one data storage device 104, e.g., more than one HDD. Moreover, as indicated above, the fan 102 is given as an example and may represent a cooling system device generally of the computing device 100. Cooling system devices of the computing device 100 may include to air movers other than fans, and also pumps that circulate liquid for liquid cooling of the computing device 100, and so on. Indeed, the one or more fans 102 may be given as an example of cooling system devices generally in the computing device 100 in which cooling system device vibration (or adverse impact other than vibration) may result in degradation or reduction of HDD throughput of the computing device 100.

A HDD, hard disk, hard drive, or fixed disk may be a data storage device that stores (and provides access to) digital information using one or more rigid ("hard") rapidly rotating disks (platters) coated with magnetic material. The platters may be paired with magnetic heads arranged on a moving actuator arm, which read and write data to the platter surfaces. Data may be accessed in a random-access manner, meaning that individual blocks of data can be stored or retrieved in any order and not only sequentially. HDDs are typically nonvolatile memory, retaining stored data even when powered off. HDD manufacturers include Seagate, Toshiba, Western Digital, and others.

Characteristics of an HDD may include capacity and performance. Capacity may be specified in terabytes (TB), for instance. Performance may be specified by the time required to move the heads to a track or cylinder (average access time) plus the time it takes for the desired sector to move under the head (average latency, which is a function of the physical rotational speed in revolutions per minute), and finally, the speed at which the data is transmitted (data rate). HDDs may be connected to systems by standard interface cables such as PATA (Parallel ATA), SATA (Serial ATA), USB or SAS (Serial attached SCSI) cables, and others.

The data transfer rate throughput of a data storage device such as a HDD drive may relate to the internal rate (moving data between the disk surface and the controller on the drive) and the external rate (moving data between the controller on the drive and the host system). The measurable data transfer rate may be the lower (slower) of the two rates. The sustained data transfer rate or sustained throughput of a drive may be the lower of the sustained internal and sustained external rates. The sustained rate may be less than or equal to the maximum or burst rate because typically the sustained rate may not benefit of cache or buffer memory in the drive. The internal rate may be further determined by the media rate, sector overhead time, head switch time, and cylinder switch time. Some of these factors may not be applicable to SSDs.

One or more fans 102 may dissipate heat and cool operating components in the computing device. Such a computer fan 102 may be inside and/or attached to housing of the computing device and give active cooling. Fans may draw cooler air into the housing from outside the housing, expel warm air from inside the housing, move air across an operating component of the computing device to cool the component, and/or move across a heat sink in the computing device to cool the computing device or particular component of the computing device, and so on. Generally, these fans may be in axial and sometimes centrifugal forms, or other forms.

Operating components of the computing devices may benefit from active cooling. To cool these components, fans may move heated air away from the components and draw cooler air over them. Functional specifications of the fan 102 may include airflow in cubic feet per minute (CFM), and static pressure, and the like. Moreover, the fan noise or sound (in decibels) can be a variable. Further, the speed of rotation (e.g., revolutions per minute or RPM) together with the static pressure may determine the airflow for a given fan.

Fans may be controlled via sensors and circuits (and executable code) that reduce fan speed when temperature is not high, leading to quieter operation, longer life, and lower power consumption than fixed-speed fans. Fan lifetimes may be quoted under the assumption of running at maximum speed and at a fixed ambient temperature in some instances. A fan 102 as a HDD fan may be mounted adjacent or onto a HDD.

With on/off fan control, the fan is generally either on or off. On the other hand, the speed of the fan 102 may be variable between full speed (maximum rpm) and off (zero rpm). Pulse-width modulation (PWM) is a common method of controlling computer fans. Typically, a fan can be driven between about 30% and 100% of the rated fan speed, using a signal with up to 100% duty cycle. Other ranges are applicable. Computing device firmware and software may regulate these fans based on processor and computer case temperatures, and other factors. Again, computer cooling may remove the waste heat produced by computer components, to keep components within permissible operating temperature limits. Components susceptible to temporary malfunction or failure if overheated include integrated circuits such as central processing units (CPUs), chipsets, graphics cards, and hard disk drives. Attention to patterns of airflow can reduce the development of hotspots. Moreover, one or more of the fans 102 may be employed with heatsinks to reduce temperature by actively exhausting hot air.

Cooling may be designed to reduce the ambient temperature within the case of a computer e.g. by exhausting hot air, or to cool a single component or small area (spot cooling), and the like. Components individually cooled may include the CPU, graphics processing unit (GPU), chipset, HDD, and so forth. Integrated circuits (e.g., CPU and GPU) can be significant generators of heat in computers. Heat generation can be reduced by design and selection of operating parameters such as voltage and frequency of the operating components in the computer, but acceptable performance may be promoted by managing (dissipating) heat generation via a fan, for instance.

In operation, the temperature of a computer's components may rise until the heat transferred to the surroundings is equal to the heat produced by the component, that is, when thermal equilibrium is reached. For reliable operation, the temperature should generally never exceed a specified maximum permissible value for each component. Because high temperatures can significantly reduce life span or cause damage to components, and the heat output of components can sometimes exceed the computer's cooling capacity, manufacturers often take additional precautions such that temperatures generally remain within desired limits. In some examples, a computer with thermal sensors integrated in the CPU, motherboard, chipset, or GPU can shut itself down when high temperatures are detected to prevent or reduce damage.

Fans may be employed because natural convection may be insufficient to remove adequate heat. As indicated, fans may be fitted to the computer case and/or associated with components such as CPUs, GPUs, chipset, PSU, hard drives, or as cards plugged into an expansion slot. Server cooling fans in (1 U) enclosures may be located in the middle of the enclosure, between the hard drives at the front and passive CPU heat sinks at the rear, for example. Larger (higher) enclosures also have exhaust fans, and from approximately 4 U they may have active heat sinks. Power supplies may have their own rear-facing exhaust fans. Many other configurations are applicable.

Various code may be executed by a processor to direct the computing device to read computer fan speeds, computer component temperatures, computer interior temperature, computer HDD throughput and throughput degradation, and the like, and also change computer fan speeds depending on the temperature of various components, and other factors. This code may direct the computing device to display system variables. In some examples, configurable user events can be defined to execute specific actions based on system status. Moreover, as indicated, the code may be executed by a processor to direct the computing device to alter or adjust (based on HDD throughput) the speed or operation of air movers in the computing device 100 other than fans, the speed a liquid cooling circulating pump, and/or the operation of cooling system components generally.

In the illustrated embodiment, the computing device 100 includes code 106 (e.g., instructions, logic, etc.) store in memory 108 and executable by a processor 110. The memory 108 may include volatile memory (e.g., RAM, cache, etc.), nonvolatile memory (e.g., read-only memory or ROM, etc.), firmware, and so forth. Further, the computing device 100 may include more than one processor 110, and each processor 110 may include multiple cores.

Moreover, the memory 108 and the processor 110 may be part of or coupled to an integrated circuit or control board 112, depending on the application or other factors. Also, the various components of the computing device 100 may be disposed inside an enclosure or housing 114. In some example, components such as the data storage device 104 (e.g., HDD) may be disposed outside of the housing 114.

The code 106, or other executable code associated with the computing device 100, may provide for control of the fan 102 and other fans in the computing device 100. In operation, the fan 102 may cool the computing device generally and/or the data storage device 104, for example. The fans (and their rotating speed in RPM) in the computing device 100 may be controlled via the code 104 or other code as a function of temperature in the computing device 100, the temperature margins between component temperatures and the temperature in the computing device 100, and the throughput of the data storage device 104. Moreover, in some examples, the fan 102 in operation may cool a data storage device 104.

In sum, the computing device 100 may include one or more fans 102, one or more data storage devices 104 (e.g., HDD, SSD, etc.), a processor 110, and memory 108 storing code 106 executable by the processor to control speed of the fan 102 at least as a function of throughput of the data storage device 104. In certain embodiments, a device storage 104 is the memory 108 and stores the code 106. On the other hand, the code 106 may be stored as firmware on a circuit board, controller, or storage controller such as a RAID (redundant array of inexpensive disks) controller.

Further, portions of the code 106 may be stored in memory in different location or of different controllers. For example, a first portion of the code 106 that reads or determines HDD throughput and compares the throughput to a threshold may be stored or associated with a different location or controller than a second portion of the code 106 that directs adjustment of the fan 102 speed.

In an example, to control the fan 102 as a function of throughput of the data storage device 104 reduces the RPM of the fan 102 (e.g., to 40%, 50%, 60%, 70%, 80%, etc. of maximum RPM) in response to degradation of the throughput of the data storage device 104. To reduce the RPM in response to a reduction in throughput of the data storage device 104 may override controlling of the RPM of the fan 102 that is based on temperature, e.g., temperature in the computing device 100, temperature of components of the computing device, a temperature margin between computing device 100 interior temperature and component temperature, and so forth.

Figure 2:
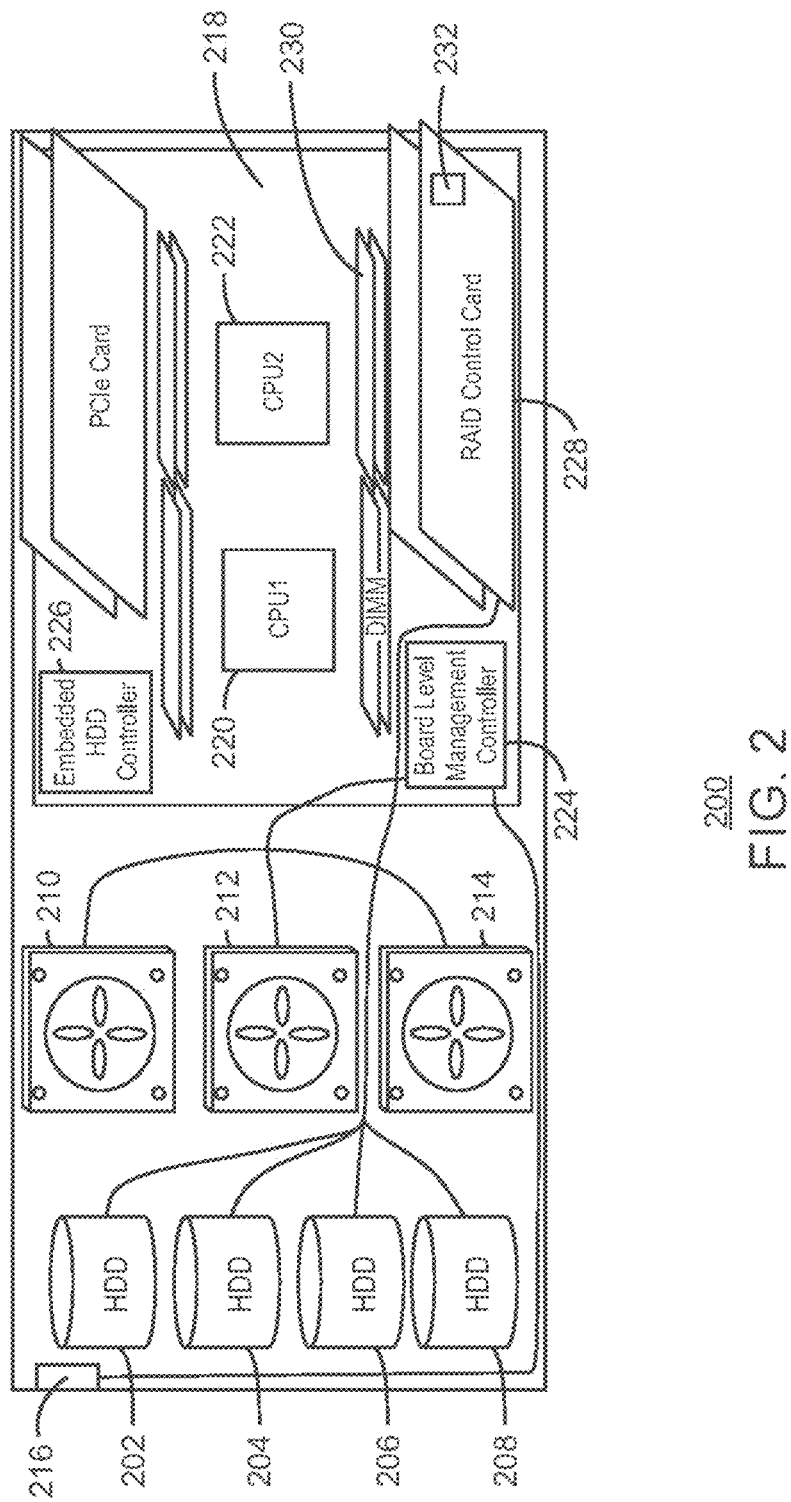
FIG. 2 is a block diagram of a computing device having fans and hard disk drives in accordance with examples.

FIG. 2 is a computing device 200 having at least four HDDs 202, 204, 206, and 208, and at least three fans 210, 212, and 214 (e.g., axial fans). In operation, the fans 210, 212, and/or 214 may cool the computing device 200 and/or the HDDs 202, 204, 206, and 208. Further, the computing device 200 may include at least one temperature sensor 216, e.g., thermocouple, resistance temperature device (RTD), thermistor, infrared thermometers, etc., to measure the ambient temperature inside (interior) of the computing device 200. Such an ambient temperature measurement value may be input to control of speed of the fans. The computing device may also have a temperature sensor (not shown) for each HDD 202, 206, 208, as well as temperature sensors for other components such as processors or CPUs. The measured temperature values of the HDDs 202, 204, 206, 208 and other components, and the temperature difference between the interior ambient versus the HDDs 202, 204, 206, 208 and other components, may also be input to a control scheme of the fan 210, 212, and/or 214.

The computing device 200 includes a circuit board 218 having at least one processor such as CPUs 220 and 222. Also, the board 218 may include volatile memory 230 such as random access memory (RAM) or dual in-line memory modules and/or other types of volatile memory. Further, the board may include PCIe cards such as network cards, graphics cards, and other type of cards and integrated circuits.

In the illustrated example, the circuit board 218 includes a board level management controller 224 (or similar controller) which may have memory and a processor (e.g., microprocessor). In certain examples in operation, the board level management controller may direct and adjust operation (e.g., rotational speed) of the fans 210, 212, 214. The circuit board 218 may also include an embedded HDD controller 226 and/or at least one RAID control card (controller) 228. The embedded HDD controller 226 and each RAID control card 228 may have memory and their respective processor (e.g., microprocessor). Further, the embedded HDD controller 226 and/or each RAID control card 228 may be operationally coupled to the HDDs 202, 206, 208 to direct operation of the HDDs 202, 206, 208.

Some computing devices 200 may have an embedded HDD controller 226 but not a RAID controller 228. Other computing devices 200 may have a RAID controller 228 (e.g., multiple RAID controllers 228) but not an embedded HDD controller 226. Such may depend, for example, on the type or complexity of the HDDs 202, 206, 208. It should be noted that while the exemplary FIG. 2 depicts both an embedded HDD controller 226 and a RAID controller(s) 228, the computing device 200 may typically have the embedded HDD controller 226 or the RAID controller(s) 228, not both the controller 226 and the controller(s) 228. On the other hand, if the board 218 does have both the controller 226 and the controller(s) 228, as depicted, then either the controller 226 or the controller(s) 228 may be disconnected and not used.

The embedded HDD controller 226 and the RAID controller cards 228 may have executable code 232. Further, the board management controller 224 (or similar controller) may have executable code 232A that can associate with the code 232. Code 232 and 232A (e.g., logic, instructions, etc.) may be executed by one or more processors (e.g., embedded HDD controller 226, RAID controller 228, board level management controller 224, CPUs 220 and 200, etc.) to control the fans 210, 212, and/or 214 at least as a function of throughput of the HDDs 202, 206, and/or 208. In certain examples, such control may provide for control of speed of the fans 210, 212, 214 as a function of throughput of the HDDs 202, 206, 208. In other words, the control may reduce the RPM (e.g., to 40%, 50%, 60%, 70%, 80%, etc. of maximum RPM) of one or more of the fans 210, 212, 214 in response to degradation of the throughput of one or more of the HDDs 202, 206, 208. To reduce the RPM in response to a reduction in throughput of the HDDs 202, 206, 208 may override controlling of the RPM of one or more of the fans that is based on temperature. The code 232 and 232A, and associated processors, may receive as input an indication of data-rate throughput of an HDD 202, 206, 208.

In the illustrated embodiment, the code 232 is depicted as stored in memory (e.g., firmware) of the embedded HDD controller 226 and/or the RAID controller 228. The associated code 232A is depicted as stored in memory (e.g., firmware) of the board level management controller 224. However, the code 232 and 232A may be stored in other memory of the computing device 200, and executed by other controllers or processors.

In operation in some examples, the code 232 when executed may direct the controller or processor (e.g., microprocessor, controller processor, CPU) to read the throughput rate of the HDDs 202, 206, 208, and to determine if the HDDs 202, 206, 208 have (or are experiencing) a reduction or degradation in throughput. If degradation is detected via the code 232, the code 232 may then direct the controller 226 or 228 to compare the reduction in throughout to a threshold (e.g., a threshold numerical value of 25% reduction) to decide if speed of one or more of the fans 210, 212, 214 is to be reduced.

If the degradation has reached the threshold, the code 232 when executed may direct the controller 226 or 228 to instruct, for example, the board level management controller 224 to reduce the speed of one or more of the fans 210, 212, 214 (e.g., to lower to—or cap the speed at −80% of maximum RPM of the fan). Such control may be dynamic. Further, the board management controller 224 (or similar controller) may include code to control the speed of the fans 210, 212, 214 as a function of temperature and/or temperature margin. Again, however, such control based on temperature may be overridden by instruction to lower or cap fan speed based on HDD throughput.

Moreover, the code 232 may include the throughput reduction threshold value (e.g., 25%) store in the memory or firmware of the controller 226 or 228. In some examples, the code 232 when executed may provide for a user-input of the threshold value. Similarly, the code 232A may include what the fan speed value (e.g., 80% of maximum RPM) is to be reduced or capped stored in memory or firmware of the controller 228, and such may also be user-input in particular examples. Other configurations are applicable.

Figure 3:
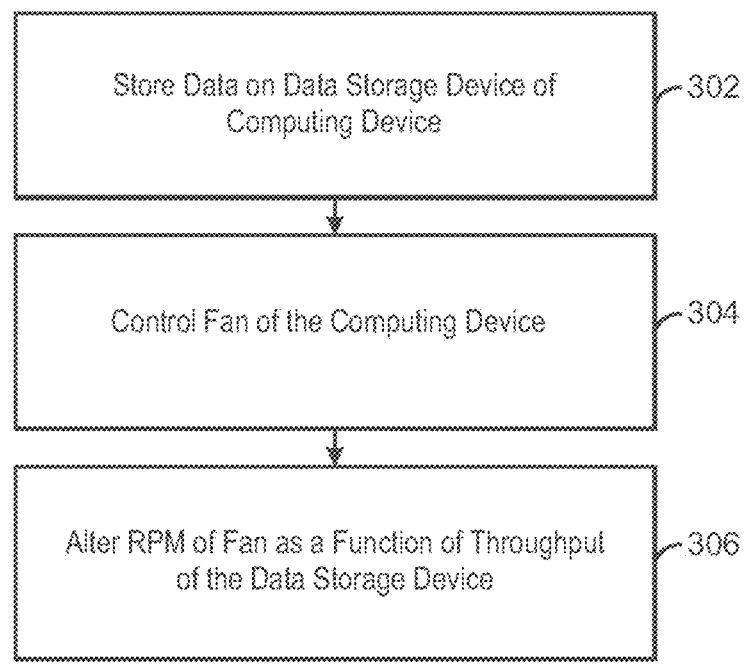
FIG. 3 is a block diagram of a method of operating computing device including controlling a fan of a computing device in accordance with examples.

FIG. 3 is a method 300 of operating a computing device. At block 302, the computing device stores data on at least one data storage device (e.g., HDD, SSD, etc.) of the computing device. At block 304, the computing device controls at least one fan of the computing device, so to cool the computing device and/or to cool components (e.g., processors, the data storage device, etc.) of the computing device. The control may be based on temperature. Indeed, in the cooling the of the computing device and/data storage device with the fan, wherein the controlling comprises adjusting the RPM of the fan as a function of at least one of temperature in the computing device or of temperature of the HDD.

However, as indicated in block 306, the control may alter the RPM of the fan based on (as a function of) throughput of the data storage device. The throughput or disk transfer rate (sometimes called media rate) may be the speed at which data is transferred to and from the disk media (disk platter) and can be generally described in megabytes per second (MB/s). The method 300 may include determining the throughput of the data storage device.

In some examples, the RPM of the fan may be controlled as a function of temperature, and wherein the altering of the RPM based on the throughput of the HDD overrides the controlling of the RPM of the fan based on temperature. The altering of the RPM of the fan as a function of throughput of the HDD may include reducing the RPM of the fan (e.g., to 40%, 50%, 60%, 70%, 80%, etc. of maximum RPM) in response to degradation of the throughput of the HDD. In some examples, the altering the RPM based on the throughput of the HDD comprises reducing the RPM in response to throughput of the HDD degraded by more than at threshold (e.g., by more than a percentage such as 15%, 20%, 25% 30%, 35%, etc. reduction of throughput).

The controlling may include adjusting the RPM of the fan based on at least one of temperature in the computing device or on temperature of the data storage device, and/or on a temperature margin between the measured ambient temperature in the interior of the computer device housing versus measured temperature of components such as the data storage devices, processors (e.g., CPUs), etc. The altering the RPM of the fan as a function of throughput of the data storage device may be higher priority than the adjusting of the RPM based on at least one of temperature in the computing device or on temperature of the data storage device, or on other temperatures or temperature margins.

Figure 4:
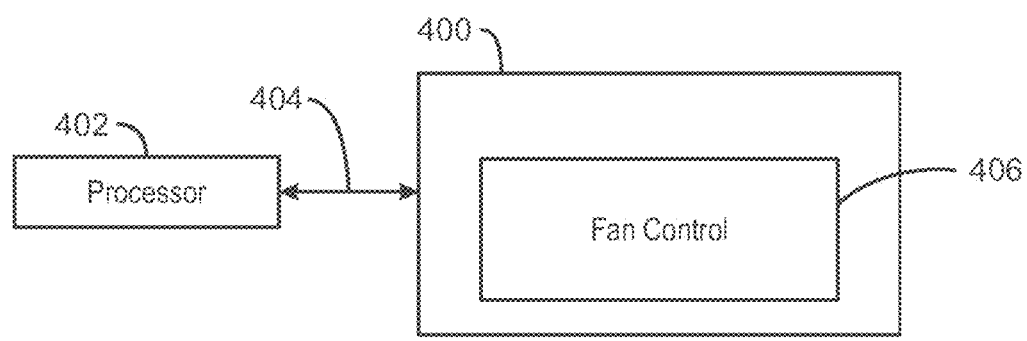
FIG. 4 is a block diagram showing a tangible, non-transitory, computer-readable medium that stores code configured to direct a processor to control a fan of a computing device in accordance with examples.

FIG. 4 is a block diagram showing a tangible, non-transitory, computer-readable medium that stores code including fan control code for a computing device to control one or more fans of the computing, e.g., to control the RPM of the fan, such based on throughput of a disk storage device (e.g., HDD) of the computing device. The computer-readable medium is referred to by the reference number 400. The computer-readable medium 400 can include RAM, a hard disk drive, an array of hard disk drives, an optical drive, an array of optical drives, a non-volatile memory, a flash drive, a digital versatile disk (DVD), or a compact disk (CD), among others. The computer-readable medium 400 may be accessed by a processor 402 over a computer bus 404. Furthermore, as indicated, the computer-readable medium 400 may include code configured to perform the methods and techniques described herein. The various software components discussed herein may be stored on the computer-readable medium 400. A portion 406 of the computer-readable medium 400 can include fan control code, as mentioned. The code in portion 406 may be analogous to the code 106 232, and/or 232A discussed above with respect to the preceding figures.

An example includes a tangible, non-transitory, computer-readable medium having code in the portion 406 including instructions that direct a processor to alter the RPM of a fan of a computing device based on throughput of a hard disk drive (HDD) of the computing device, wherein to alter the RPM based on the throughput of the HDD overrides control of the RPM of the fan based on temperature. To alter the RPM of the fan based on throughput of the HDD may include to reduce the RPM of the fan in response to degradation of the throughput of the HDD. Indeed, to alter the RPM of the fan (e.g., to 80% of maximum RPM) based on throughput of the HDD includes to reduce the RPM of the fan in response to a reduction of, for example, at least 25% of the throughput of the HDD.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A method of operating a computing device, comprising:
   storing data on a data storage device of the computing device;
   determining a value of a throughput of the data storage device; and
   controlling a fan of the computing device, the controlling of the fan comprising altering the revolutions per minute (RPM) of the fan based on the determined value of the throughput of the data storage device, the altering being independent of a temperature of the data storage device, wherein altering the RPM of the fan based on the determined value of the throughput of the data storage device comprises reducing the RPM of the fan in response to degradation of the determined value of the throughput of the data storage device caused by vibration of the fan.

2. The method of claim 1, wherein the data storage device comprises a hard disk drive (HDD), wherein controlling further comprises controlling the RPM of the fan as a function of temperature separately from controlling the RPM of the fan based on the determined value of the throughput, and wherein the altering of the RPM based on the determined value of the throughput of the HDD overrides the controlling of the RPM of the fan that is based on temperature.

3. The method of claim 2, comprising cooling the computing device with the fan, wherein the altering the RPM based on the determined value of the throughput of the HDD comprises reducing the RPM in response to the determined value of the throughput of the HDD degraded by more than 25%.

4. The method of claim 2, comprising cooling the data storage device with the fan, wherein the controlling comprises adjusting the RPM of the fan as a function of at least one of temperature in the computing device or of temperature of the HDD.

5. The method of claim 1, wherein the controlling comprises adjusting the RPM of the fan based on at least one of temperature in the computing device or on temperature of the data storage device, wherein altering the RPM of the fan as a function of the determined value of the throughput of the data storage device is higher priority than the adjusting of the RPM based on at least one of temperature in the computing device or on temperature of the data storage device.

6. A computing device comprising:
   a fan;
   a data storage device;
   a processor;
   and memory storing code executable by the processor to determine a value of a throughput of the data storage device, and to control the fan as a function of the determined value of the throughput of the data storage device, wherein the fan is controlled independently of a temperature of the data storage device, wherein to control the fan as a function of the determined value of the throughput of the data storage device comprises to reduce the revolutions per minute (RPM) of the fan in response to degradation of the determined value of the throughput of the data storage device caused by vibration of the fan.

7. The computing device of claim 6, wherein the data storage device comprises a hard disk drive (HDD).

8. The computing device of claim 7, wherein to reduce the RPM in response to a reduction in the determined value of the throughput of the HDD overrides controlling of the RPM of the fan based on temperature.

9. The computing device of claim 7, wherein the HDD comprises multiple HDDs, and the fan comprises multiple fans.

10. The computing device of claim 6, wherein the fan is to cool the data storage device.

11. The computing device of claim 6, wherein the data storage device comprises the memory.

12. A tangible, non-transitory, computer-readable medium comprising instructions that direct a processor to determine a value of a throughput of a data storage device, and to alter the revolutions per minute (RPM) of a fan of a computing device based on the determined value of the throughput of a hard disk drive (HDD) of the computing device, wherein the RPM of the fan is altered independently of a temperature of the data storage device, and wherein to alter the RPM based on the determined value of the throughput of the HDD overrides control of the RPM of the fan based on temperature, wherein to alter the RPM of the fan based on the determined value of the throughput of the HDD comprises to reduce the RPM of the fan in response to degradation of the determined value of the throughput of the HDD caused by vibration of the fan.

13. The computer-readable medium of claim 12, wherein to alter the RPM of the fan based on the determined value of the throughput of the HDD comprises to reduce the RPM of the fan in response to a reduction of at least 25% of the determined value of the throughput of the HDD.

* * * * *